United States Patent Office.

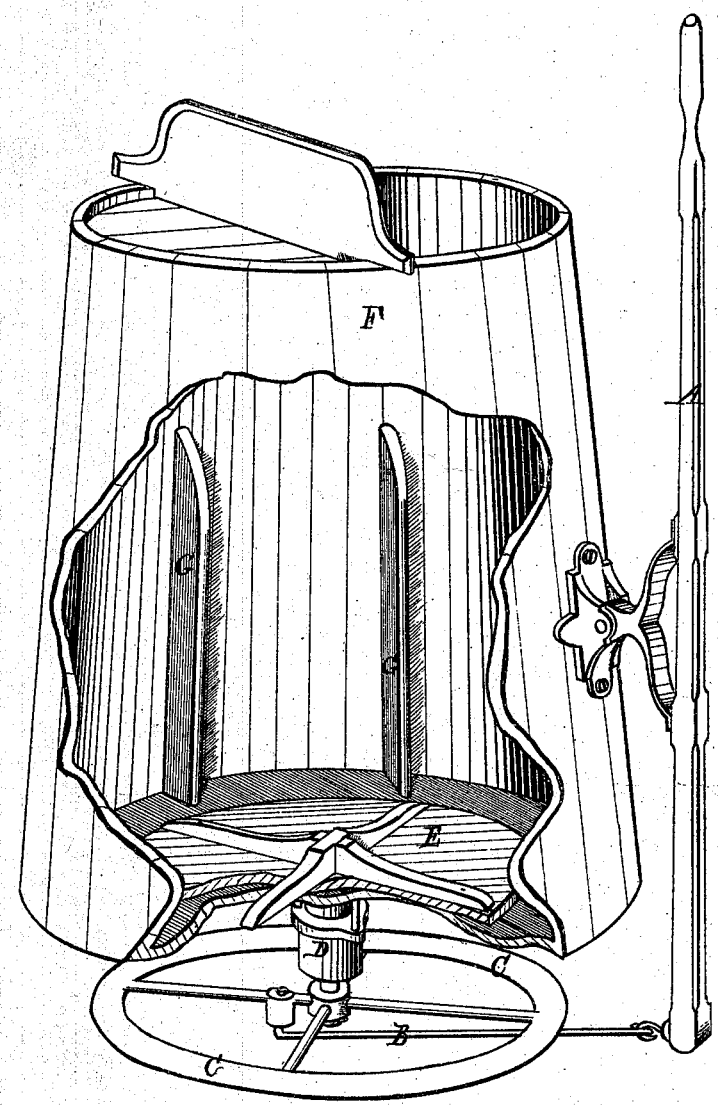

OSMAN SMITH KING, OF PAINESVILLE, OHIO.

Letters Patent No. 112,603, dated March 14, 1871.

IMPROVEMENT IN WASHING-MACHINES.

The Schedule referred to in these Letters Patent and making part of the same.

*To all whom it may concern:*

Be it known that I, OSMAN SMITH KING, of Painesville, in the State of Ohio, have invented a new and useful Improvement in Washing-Machines; and I do hereby declare the following to be a full, clear, and exact description thereof, which will enable any person skilled in the art to which it appertains to make and use my invention, reference being had to the accompanying drawing, which is a perspective view of a washing-machine with my improvement attached, part of the machine being broken away to show my improvement.

To the tub F, which may be provided with breaks G G of ordinary construction, as shown, I pivot a lever, A, to which is connected one end of a rod or pitman, B, whose other end is connected in any convenient manner to the fly-wheel C, located under the tub, and to whose shaft, which passes upward through a packing-box, D, is secured the flanged disk E.

By moving the lever A to and fro, the fly-wheel and disk are revolved so as to operate the machine in the usual manner.

What I claim as my invention, and desire to secure by Letters Patent of the United States, is—

The combination of the lever, connecting-rod, and fly-wheel, operating to revolve the disk of the washing-machine, and arranged in relation thereto, as shown and described.

O. S. KING.

Witnesses:
    JOHN P. ROGERS,
    WM. R. WRIGHT.